(12) United States Patent
Moffat et al.

(10) Patent No.: US 9,663,615 B1
(45) Date of Patent: May 30, 2017

(54) METHOD OF MAKING BRANCHED POLYESTER RESIN

(71) Applicant: XEROX CORPORATION, Norwalk, CT (US)

(72) Inventors: Karen A. Moffat, Brantford (CA); Shigang S. Qiu, Etobicoke (CA); Yulin Wang, Oakville (CA); Kevin F. Marcell, Webster, NY (US); Wafa F. Bashir, Mississauga (CA); Richard P N Veregin, Mississauga (CA); John Lawrence Pawlak, Rochester, NY (US); Christopher M. Wolfe, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/017,328

(22) Filed: Feb. 5, 2016

(51) Int. Cl.
*C08G 63/02* (2006.01)
*C08G 63/64* (2006.01)
*C08G 63/78* (2006.01)

(52) U.S. Cl.
CPC ............. *C08G 63/64* (2013.01); *C08G 63/78* (2013.01)

(58) Field of Classification Search
CPC ..................................................... C08G 63/64
USPC ............... 528/193, 194; 524/403; 430/109.4, 430/110.2
See application file for complete search history.

(56) References Cited

U.S. PATENT DOCUMENTS

| | | | |
|---|---|---|---|
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,403,693 A | 4/1995 | Patel et al. | |
| 5,418,108 A | 5/1995 | Kmiecik-Lawrynowicz et al. | |
| 6,180,747 B1 * | 1/2001 | Sacripante ............. C08G 63/42 430/109.4 |
| 8,288,499 B2 | 10/2012 | Shirai et al. | |

* cited by examiner

*Primary Examiner* — Terressa Boykin
(74) *Attorney, Agent, or Firm* — Pillsbury Winthrop Shaw Pittman LLP

(57) ABSTRACT

A method of synthesizing a branched polyester resin. Particularly, the method includes an alkoxylation reaction that includes reacting a monomer bisphenol A with a cyclic alkylene carbonate.

19 Claims, 5 Drawing Sheets

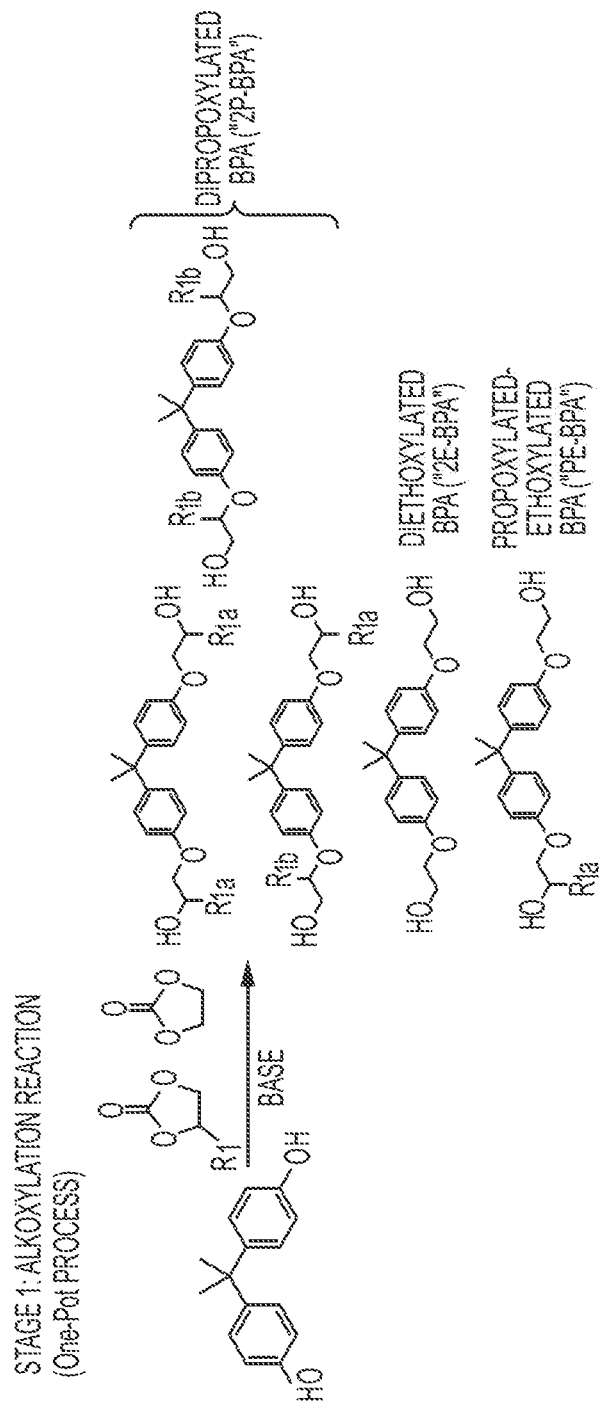

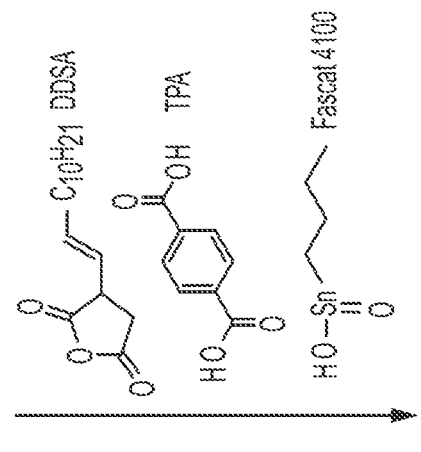

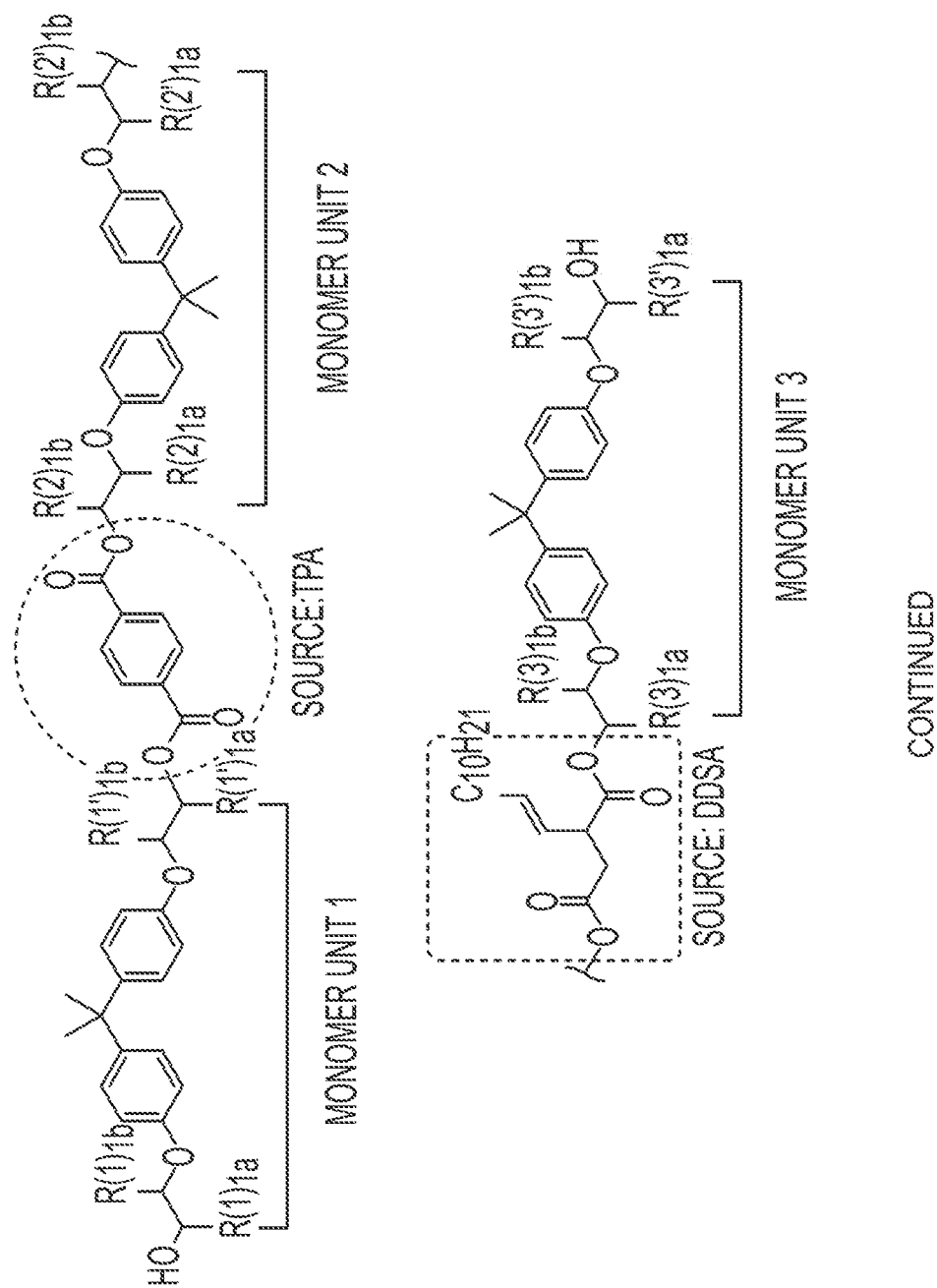

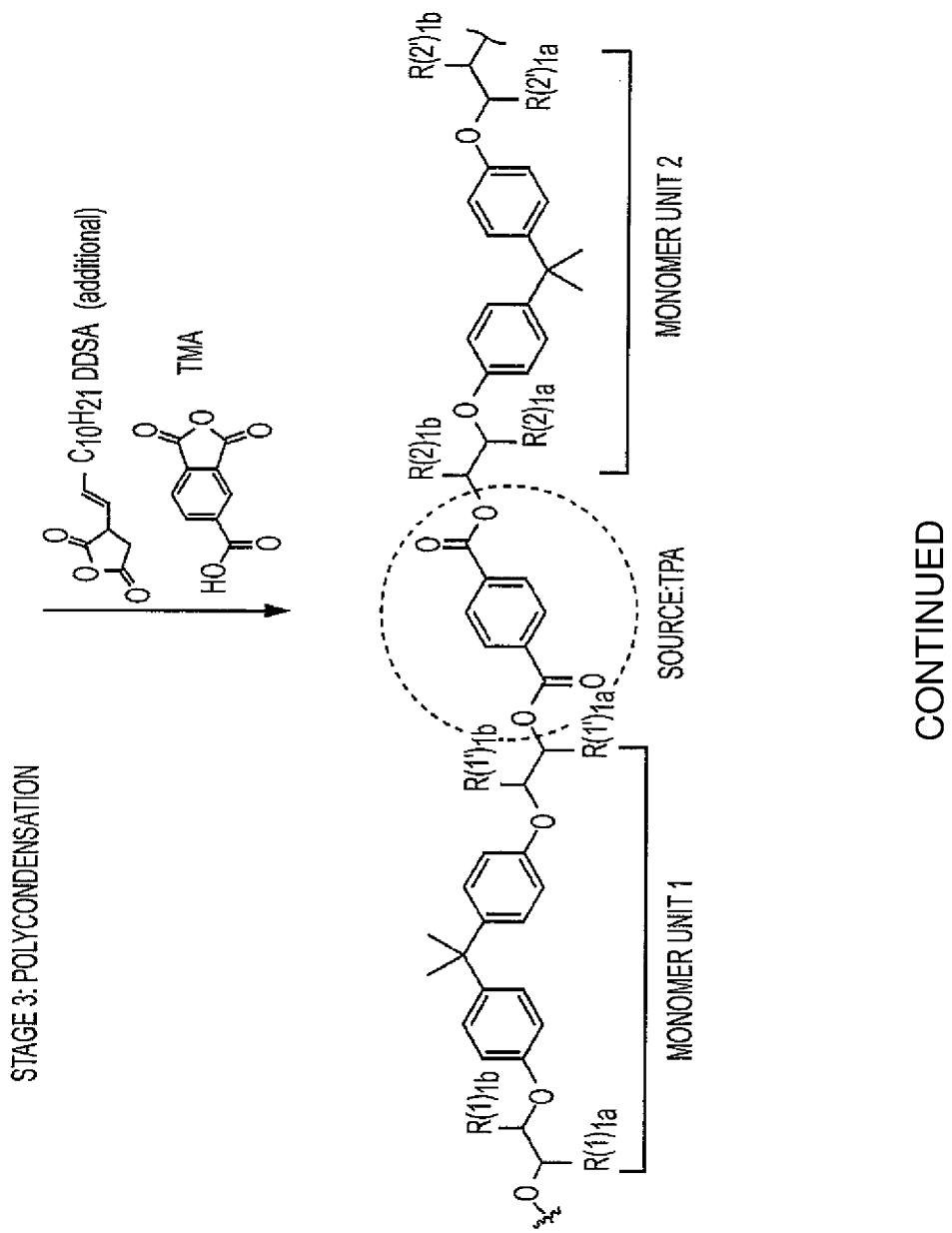

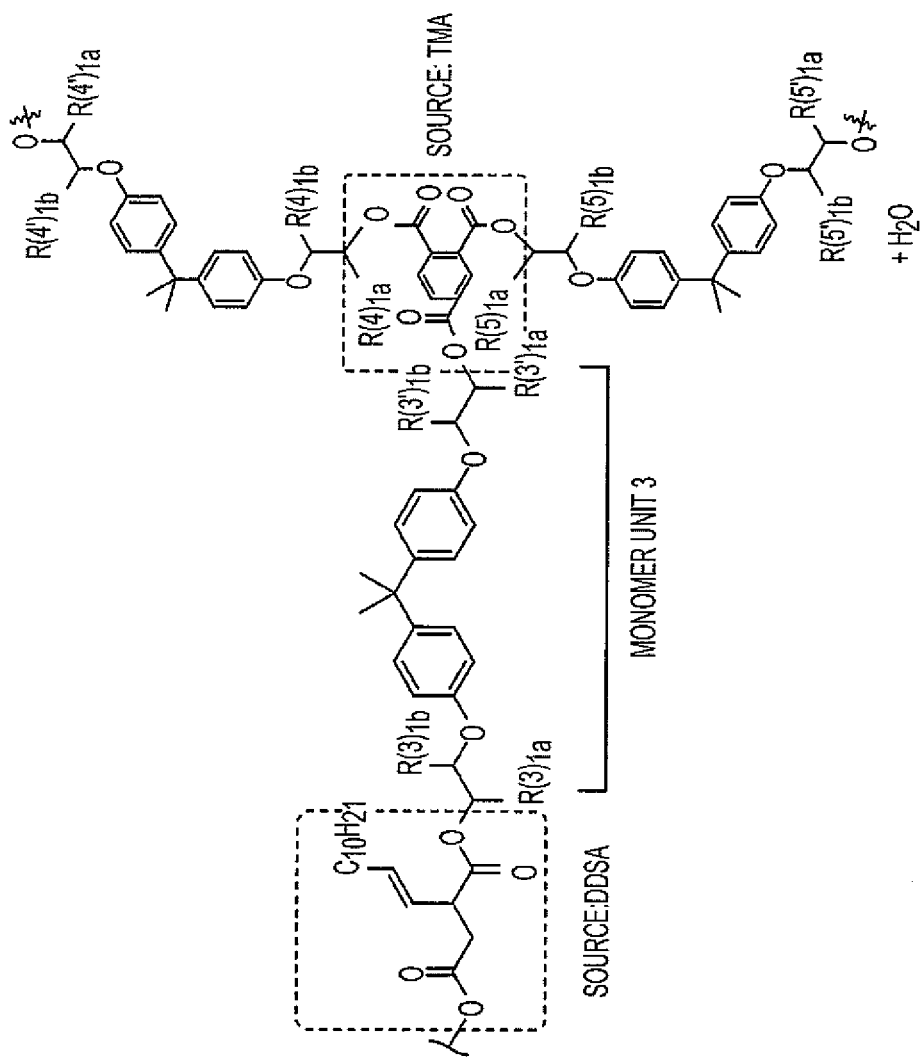

METHOD OF MAKING BRANCHED POLYESTER RESIN

BACKGROUND

The present disclosure relates to, in various exemplary embodiments, to processes in synthesizing a branched amorphous polyester resin. The branched amorphous polyester resin of the present embodiments may be used in toners, such as Emulsion Aggregation (EA) toners, which are prepared using an emulsion aggregation process. Emulsion aggregation processes for the preparation of toners are illustrated in a number of Xerox patents, the disclosures of which are totally incorporated herein by reference, such as U.S. Pat. Nos. 5,290,654, 5,278,020, 5,308,734, 5,346,797, 5,370,963, 5,344,738, 5,403,693, 5,418,108, and 5,364,729.

Toners must not aggregate or block during manufacturing, transport or storage periods before use in electrographic systems, and must exhibit low fusing temperature properties in order to minimize fuser energy requirements. Accordingly, to satisfy blocking requirements, toner resins should exhibit glass transition temperatures (Tg) of 50° C. or above (e.g., from about 40.0° C. to about 80° C.).

Fixing performance of toners can be characterized as a function of temperature and pressure. The temperature at which the toner adheres to the fuser roll is called the hot offset temperature (HOT). When the toners offsets onto the fuser roll, the image density and quality of the fused image is compromised—less dense image, incomplete image etc. At the HOT or higher, some of the molten toner adheres to the fuser roll during fixing and is transferred to subsequent substrates containing developed images, resulting for example in blurred images. This undesirable phenomenon is called offsetting. Less than the HOT of the toner is the minimum fixing temperature (MFT) of the toner, which is the minimum temperature at which acceptable adhesion of the toner to the support medium occurs. The difference between these two temperatures should be a large as possible defining an acceptable fusing temperature latitude range when toners can be fused without fusing defects. Toner resins should exhibit a MFT of 60° C. or above (e.g., from about 60° C. to about 140° C.) to adhere properly to the substrate, and a HOT of 190° C. or above (e.g., from about 190 to about 230) to avoid print defects and fuser contamination.

Pricing is another important consideration in the toner resin selection decision. Resin generally comprises more than 80% of the final toner by weight. Therefore, the price of the resin is a very large factor in the final cost to manufacture toner. Further, there are many competing technologies for the production of printed documents and graphics other than xerography. Therefore, in order to remain a technology of choice, the price of toner must be kept as low as possible.

Over time, there has been a shift toward employing low melt toner resins for improved throughput and/or reduced energy consumption. The newer generation toners incorporate so called ultra-low melt (ULM) polyester technology that includes the combination of amorphous and crystalline polyester resins to provide optimized fusing performance even in relatively simple printers. Polyesters are broadly separated into two categories of amorphous (APE) and crystalline (CPE) based on their thermal characteristics (resin flow measured by glass transition temperature or relatively sharp melting measured by the melting point). Amorphous polyesters are further broken down into linear, branched and cross-linked resins. High molecular weight branched polyesters are required in order to control fuser hot offset (i.e., residual toner build-up on the fuser roll) as well as the glossiness of the final image, which is particularly relevant for high end graphics applications. They are able to fulfill this role due to having relatively high weight average molecular weight (MW) and a relatively high degree of polydispersity which provides a substantial degree of resin elasticity. To use the polyester resins in the emulsion aggregation process, the resin must be dispersed by the phase inversion emulsification (PIE) process. This requires the resin to be completely soluble in an organic solvent prior to the addition of water and subsequent phase inversion in water.

One major difficulty in producing branched amorphous polyester resins is to properly control the degree of branching which is the fraction of the resin that is not completely soluble in solvent. The controlled amount of branching is necessary to optimize the fusing performance. In general, typical concerns with the synthesis of branched amorphous polyester resins include the uses of dangerous materials, such as, ethylene oxide and propylene oxide, which are dangerous flammable toxic gases that require special costly equipment for safe handling. Another concern with the existing process for producing branched amorphous polyesters is the isolation of the alkoxylated intermediates prior to use in the polyesterification step, which leads to additional cost and complexity in synthesizing the final branched amorphous polyester resins.

Thus, there exists a need to improve the current process of producing branched amorphous polyester resins.

SUMMARY

Embodiments herein relate to a method of making a branched polyester resin comprising contacting a monomer bisphenol A (BPA) with a mixture of cyclic alkylene carbonates in the presence of a base to obtain a reaction mixture comprising two or more alkoxylated BPA monomers; copolymerizing the two or more alkoxylated BPA monomers with a diacid in the presence of a catalyst to obtain a copolymer; and condensing the copolymer with an acid anhydride or a triacid.

In certain embodiments, the disclosure provides a method of making a branched polyester resin comprising contacting a monomer bisphenol A (BPA) with a mixture of propylene carbonate and ethylene carbonate in the presence of a base to obtain a reaction mixture comprising two or more alkoxylated BPA monomers; copolymerizing the two or more alkoxylated BPA monomers with a diacid in the presence of a catalyst to obtain a copolymer; wherein the diacid comprises terephthalic acid, dodecenylsuccinic anhydride (DDSA), or mixtures thereof; and condensing the copolymer with an acid anhydride, wherein the acid anhydride comprises an anhydride such as trimellitic anhydride.

In some aspects, the disclosure provides a branched polyester resin produced according to the methods described herein.

BRIEF DESCRIPTION OF THE DRAWINGS

For better understanding of the present embodiments, reference may be made to the accompanying figures.

FIG. 1 shows exemplary reaction schemes of the three stages (stage 1: alkoxylation reaction; stage 2: esterification reaction; and stage 3: polycondensation) in accordance to certain embodiments of the present disclosure.

DETAILED DESCRIPTION

Disclosure herein provides methods of producing branched polyester resins. The branched polyester resins of the present embodiments can be synthesized in three steps, which include: stage 1: alkoxylation reaction; stage 2: esterification reaction; and stage 3: polycondensation.

Stage 1 involves the alkoxylation reaction of monomer bisphenol A (BPA) with a mixture of cyclic alkylene carbonates in the presence of a base to obtain a reaction mixture comprising two or more alkoxylated BPA monomers. Exemplary cyclic alkylene carbonates include propylene carbonate, ethylene carbonate, 1,2-butylene carbonate, trans-1,3-butylene carbonate, 1,3-propylene carbonate, trans-2,3-butylene carbonate, cis-2,3-butylene carbonate, or mixtures thereof. The molar ratio of the monomer bisphenol A to the mixture of cyclic alkylene carbonates may be from about 0.3 to about 2.5, from about 0.6 to about 2.4, or from about 0.8 to about 2.3.

The alkoxylated BPA monomers are functionalized diols. For example, in embodiments, when BPA reacts with a mixture of propylene carbonate and ethylene carbonate produces a mixture of dipropoxylated-BPA (2P-BPA), diethoxylated-BPA (2E-BPA) and propoxylated-ethoxylated-EPA (PE-BPA):

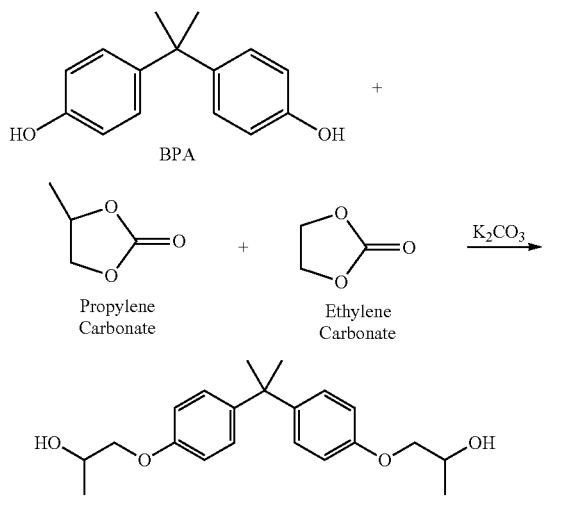

dipropoxylated-BPA (2P-BPA)

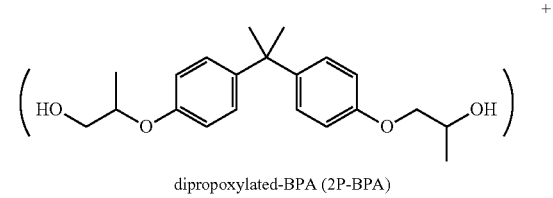

diethoxylated-BPA (2E-BPA)

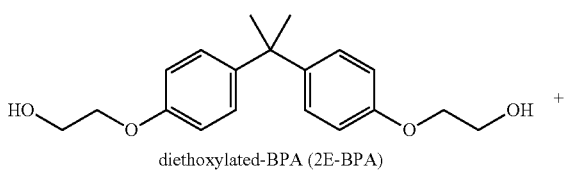

propoxylated-ethoxylated-EPA (PE-BPA)

FIG. 1 (Stage 1 reaction scheme) demonstrates, in embodiments, a reaction between BPA and a mixture of 5-membered ring cyclic alkylene carbonates. (Note: mixtures of 6-membered ring cyclic alkylene carbonates or mixtures of 5- and 6-membered ring cyclic alkylene carbonates can be used in the present embodiments, but not shown in FIG. 1). $R_1$ represents lower alkyl, such as methyl, ethyl. $R_{1a}$ and $R_{1b}$ represent the location of $R_1$, as shown in the scheme, $R_{1a}$ represents $R_1$ group attached to the carbon atom adjacent to the terminal hydroxyl. $R_{1b}$ represents $R_1$ group attached to the carbon atom adjacent to the oxygen atom of the BPA. As shown in the scheme, the alkoxylated BPA monomers obtained from the alkoxylation reaction can be completely alkylated by one type of cyclic alkylene carbonate, or alkylated by a mixture of cyclic alkylene carbonates. The ratio of the alkoxylation reaction products (i.e., different alkoxylated BPA monomers) depends on the ratio of the different type of cyclic alkylene carbonates used.

The alkoxylation reaction may be carried out under basic conditions with the addition of a base, examples being alkali metal hydroxides, alkali metal carbonates, alkali metal hydrogen carbonates, such as, potassium hydroxide, sodium hydroxide, potassium carbonate, potassium hydrogen carbonate, etc. in an amount between about 0.01 and about 0.5 weight percent, about 0.05 and about 0.3 weight percent, based on total reaction mixture. The by-product of the alkoxylation reaction is the liberation of carbon dioxide. The alkoxylation reaction may be effected at a temperature of between about 150° C. and about 200° C., or from about 160° C. and about 190° C. The alkoxylation reaction takes place over a period of from about 3 to about 7 hours, more usually from about 3.5 to about 6 hours.

Upon completion of stage 1, the products of the alkoxylation reaction (i.e., alkoxylated BPA monomers) may be employed in the polyesterification reaction (Stage 2) without further purification. A diacid (or mixtures of diacids) is then mixed with the alkoxylated BPA monomers in the presence of a catalyst to generate a copolymer.

The term "diacid" used herein, refers to compounds containing dicarboxylic acids or the source compounds of the dicarboxylic acids derived from (i.e., acid anhydrides). Examples of diacid include dicarboxylic acids of terephthalic acid (TPA), phthalic acid, isophthalic acid, fumaric acid, maleic acid, succinic acid, itaconic acid, succinic acid, succinic anhydride, dodecenylsuccinic acid, dodecenylsuccinic anhydride (DDSA), glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. In embodiments, the diacid may be used in the polyesterification reaction (Stage 2) include terephthalic acid, dodecenylsuccinic anhydride, or mixture thereof. The diacid may be selected from about 45 to about 52 mole percent of the alkylated BPA monomers. In embodiments, the mole percent range of the diacid is from 45 to 52 mole percent based on the total moles of the diacid and the alkylated BPA monomers.

In embodiments, the catalyst employed in the polyesterification reaction is tin-based. Such catalysts may be based on tin (II) or tin (IV) oxidation states. In embodiments, the tin-based catalyst are mono- or dialkyl tin-based. Monoalkyl tins may further comprise oxide and/or hydroxide groups attached to the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the copolymers herein, such as octabutyltetrathiocyanatostannoxane.

The polyesterification reaction (or copolymerizing step) may be effected at a temperature of between about 180° C. and about 250° C., or from about 200° C. and about 235° C. The alkoxylation reaction takes place over a period of from about 5 to about 15 hours, more usually from about 6 to about 12 hours. During the polyesterification reaction, water is generated which may be conveniently removed either by direct distillation, using such as under vacuum and or nitrogen sparging, or by the use of a binary azeotrope during the process.

The polyesterification reaction proceeds until the acid value of the copolymer product is <1.5 (or between 0.1 and 1.5), and the resin viscosity is between 2 and 10 poise or between 4 and 8 poise, and a softening temperature (Ts) of 95° C. is reached. In embodiments, the number average molecular weight (Mn) of the copolymer may be in a range from about 5,000 to about 100,000 grams per mole, or from about 10,000 to about 200,000 grams per mole.

As shown in FIG. 1 (Stage 2 reaction scheme), the monomer unit 1, 2, and 3 of the copolymer product of Stage 2 are originated from the alkoxylated BPA monomers of Stage 1. The alkoxylated BPA monomers of Stage 1 randomly react with diacid (may contain one or more types of diacid) to produce a copolymer, where the resulting copolymer may be a mixture of copolymers each of which is made up of a random combination of alkoxylated BPA monomer units and diacid units, where $R(1)_{1a}$, $R(1)_{1b}$, $R(1')_{1a}$, $R(1')_{1b}$, $R(2)_{1a}$, $R(2)_{1b}$, $R(2')_{1a}$, $R(2')_{1b}$, $R(3)_{1a}$, $R(3)_{1b}$, $R(3')_{1a}$, $R(3')_{1b}$ ... represent $R_1$ at different locations of the copolymer. The number in the bracket indicates the location of the monomer, e.g., monomer unit 1, 2, 3 . . . .

In embodiments, the alkoxylated BPA monomer unit may be present in a range from about 50 to about 95 mole percent, from about 55 to about 90 mole percent, or from about 55 to about 85 mole percent of the copolymer.

Prior to Stage 3 polycondensation, the temperature of the reaction mixture may be lowered to about 150° C. to about 180° C., or about 170° C. In Stage 3, the polycondensation reaction proceeds at an elevated temperature with applied vacuum where the copolymer prepared from Stage 2 is condensed with an acid anhydride to form a branched resin. The acid anhydride employed for polycondensation can also includes a triacid or a tetraacid. Examples of triacid include, but are not limited to, trimellitic anhydride (TMA) and citric acid. Examples of tetraacid include, but are not limited to, tetrahydrophthalic anhydride. The term "trimellitic anhydride" encompasses substituted or unsubstituted trimellitic anhydride as well as the acid counterpart to trimellitic anhydride.

Additional diacid (e.g., DDSA) may be added along with the acid to control the degree of branching. In those cases where the diacid can also form an anhydride, the anhydride may be used instead. The amount of diacid or anhydride added during the condensation reaction (Stage 3) may be the same or less than the amount employed during the polyesterification reaction (Stage 2). The amount of diacid or anhydride added during the condensation reaction may be from about 5 to about 50 mole percent, or from 10 to about 45 mole percent or from 15 to about 45 mole percent of the copolymer.

The polycondensation reaction (or condensing step) may be effected at a temperature of between about 180° C. to about 250° C., or from about 190° C. and about 240° C., for a time period ranging from about 4 to about 20 hours, more usually from about 5 to about 12 hours. At this temperature range, the anhydride ring of the acid anhydride, e.g., trimellitic anhydride "opens" and the condensation reaction occurs between the trimellitic anhydride and the terminal hydroxyl functional group of the copolymer such that an ester bond is formed between the "opened" trimellitic anhydride and the copolymer. Moreover, the reaction between the trimellitic anhydride and the copolymer in the "condensation stage" also creates a carboxylic acid functional group on the "opened" trimellitic anhydride. Accordingly, the trimellitic anhydride will have two carboxylic acid functional groups that are available for further reaction. The two carboxylic acid functional groups of the open-ring trimellitic anhydride may then be reacted with additional copolymers via condensation reactions to produce a branched resin.

The resulting branched resin has an acid value of from about 5 mg KOH/g to about 20 mg KOH/g, a softening temperature (Ts) of from about 100° C. to about 140° C., and a glass transition temperature (Tg) of from about 35° C. to about 75° C. Acid number or acid value means the number of milligrams of potassium hydroxide required for neutralization of acid end groups present in 1 g of resin. The resulting branched resin has a number average molecular weight (Mn) in the range of from about 1,000 to about 20,000. The resulting branched resin has a weight average molecular weight (Mw) in the range of from about 25,000 to about 100,000. The branched resin of the present embodiments may be amorphous in nature.

Suitable viscosity measurements can be made using Brookfield Engineering Laboratories' Viscometer Model CAP 2000 H. Spindle #6 with operating temperature of 150° C. to 200° C. and about 750 rpm. The softening point (Ts) of the copolymer can be measured by using the cup and ball apparatus available from Mettler-Toledo as the FP90 softening point apparatus and using the Standard Test Method (ASTM) D-6090. The measurement can be conducted using a 0.50 gram sample and heated from 100° C. at a rate of 1° C./min.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

The synthetic reaction to produce copoly(propoxylated/ethoxylated bisphenol A-terephthlate-dodecenylsuccinic anhydride-trimellitic anhydride) (an exemplary resin in accordance with embodiments herein) is shown in Scheme 1 below in three separate reactions, namely alkoxylation reaction (stage 1), esterification reaction (stage 2) and polycondensation (stage 3).

Stage 1: Alkoxylation Reaction

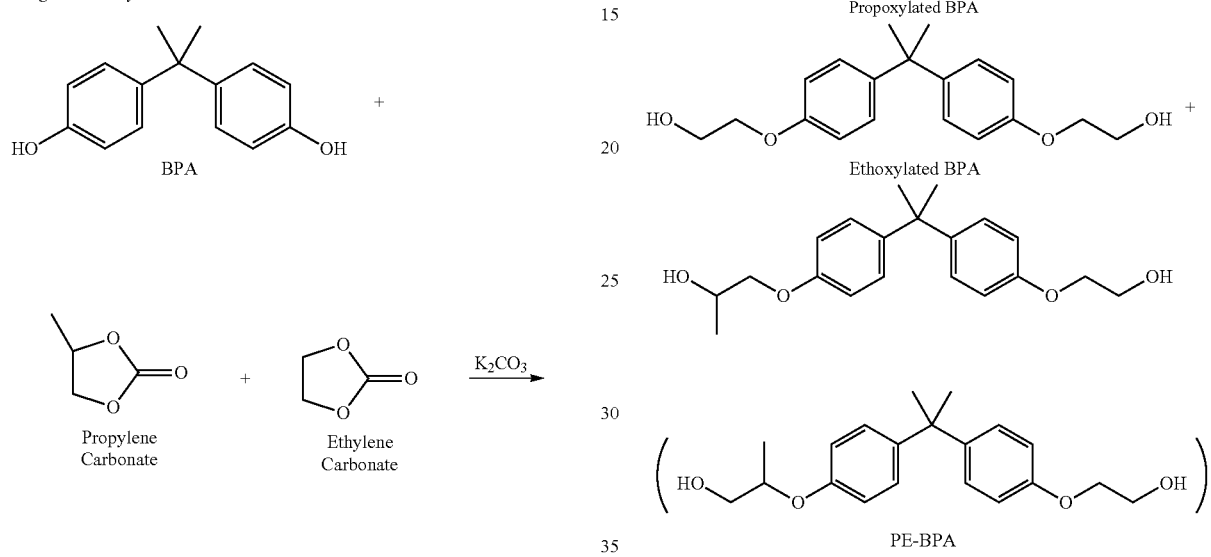

Stage 2: Esterification Reaction

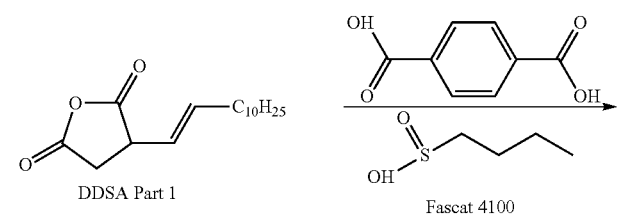

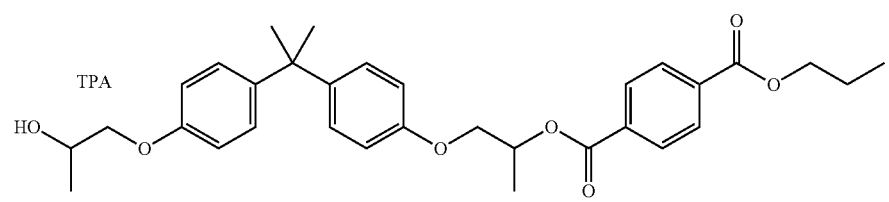

-continued

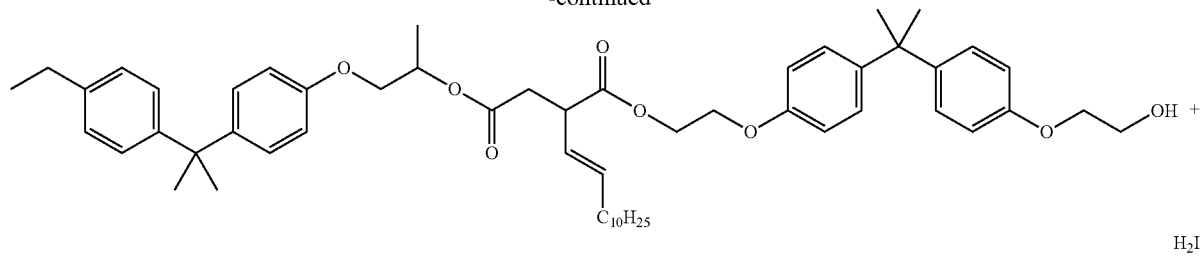

Stage 3: Polycondensation

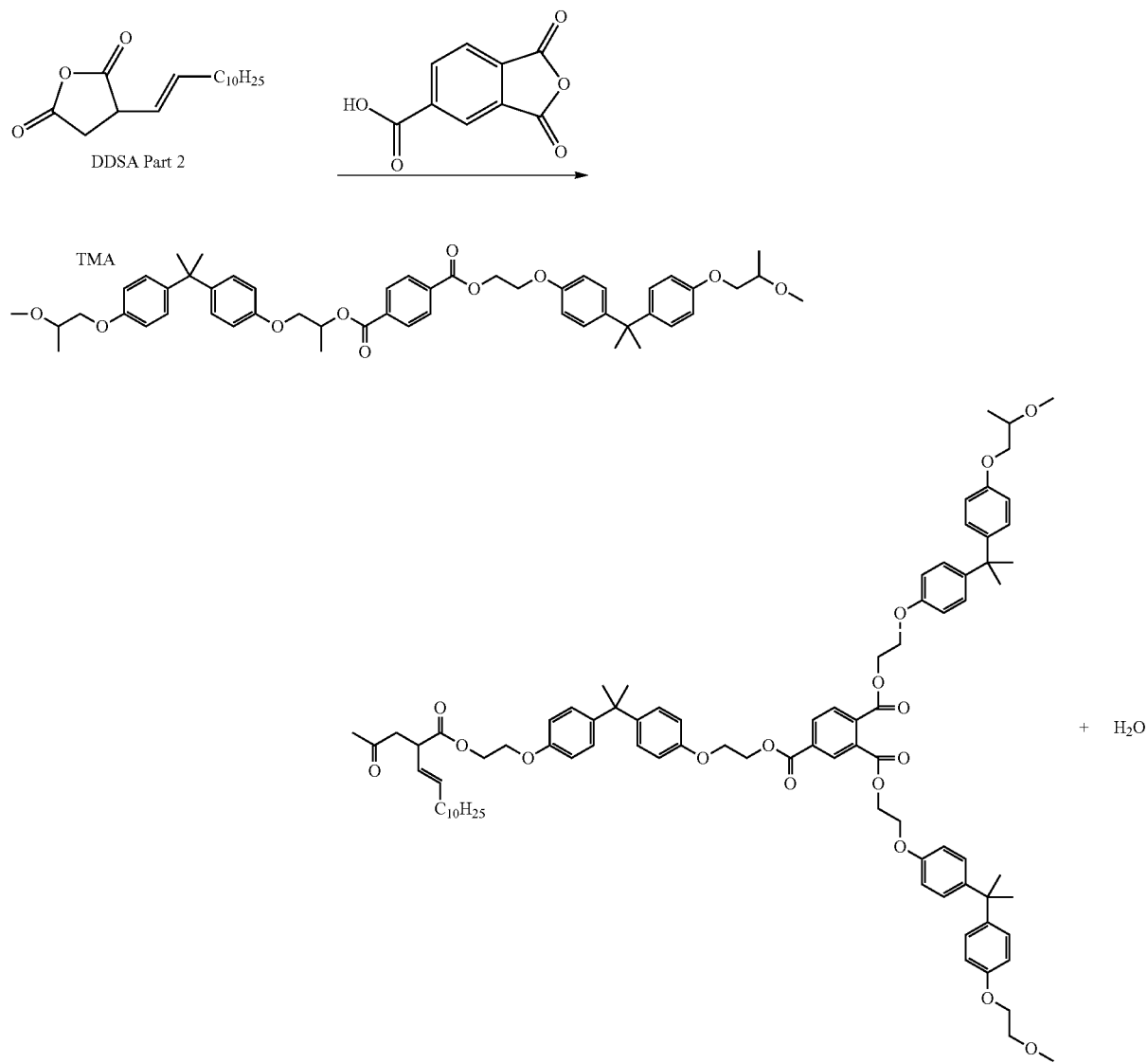

Scheme 1:

Synthetic reaction scheme to prepare copoly(propoxylated/ethoxylated bisphenol A-terephthlate-dodecenylsuccinic anhydride-trimellitic anhydride) in three separate steps. A series of copoly(propoxylated/ethoxylated bisphenol A-terephthlate-dodecenylsuccinic anhydride-trimellitic anhydride) resins were produced and summarized in Table 1 below. Examples 1-9 describe the preparation of the resins using various raw material loadings. The Resin Code lists the resin sample number and its corresponding cyan toner identification number.

TABLE 1

| Example # | Resin Code | Toner Code | A TMA Loading Based on Total Mole Percent of Acid | B COOH/OH Molar Ratio |
|---|---|---|---|---|
| 1 | Resin-1 | Toner-1 | 6.15 | 1.09 |
| 2 | Resin-2 | Toner-2 | 6.15 | 1.132 |
| 3 | Resin-3 | Toner-3 | 8.5 | 1.09 |
| 4 | Resin-4 | Toner-4 | 8.5 | 1.132 |
| 5 | Resin-5 | Toner-5 | 7.325 | 1.111 |
| 6 | Resin-6 | Toner-6 | 6.15 | 1.132 |
| 7 | Resin-2 | Toner-7 | 6.15 | 1.132 |
| 8 | Resin-7 | Toner-8 | 6.15 | 1.132 |
| 9 | Resin-8 | Toner-9 | 7.325 | 1.111 |
| 10 | Resin-9 | Toner-10 | 7.325 | 1.111 |

The copoly(propoxylated/ethoxylated bisphenol A-terephthlate-dodecenylsuccinic anhydride-trimellitic anhydride) resins were then emulsified by phase inversion emulsification (PIE) process, and used to prepare cyan toners. Xerographic evaluation was conducted using a Xerox 700 Digital Color Press (DCP) machine and the performance of the toners was compared to a series of production EA-Eco control toners.

Based on the performance of the copoly(propoxylated/ethoxylated bisphenol A-terephthlate-dodecenylsuccinic anhydride-trimellitic anhydride) resins, a centerline formulation was selected based on equivalent xerographic performance to the control toners. Subsequently, stress aging machine evaluation and toner latitude concentration (TLC) studies in the Xerox 700 DCP machine demonstrated that dispersions made from copoly(propoxylated/ethoxylated bisphenol A-terephthlate-dodecenylsuccinic anhydride-trimellitic anhydride) resins prepared by the carbonate route provides equivalent xerographic performance to a control toner made using resin prepared by an epoxide route to functionalize BPA.

Resin Synthesis and Emulsification

The synthesis of the copoly(propoxylated/ethoxylated bisphenol A-terephthlate-dodecenylsuccinic anhydride-trimellitic anhydride) resins were produced according to the following procedures:

Example 1

Resin 1:

Using trimellitic anhydride loading of 6.15 mole percent in total acid with the total diacid/diol molar ratio of 1.09.

Stage 1: Alkoxylation

A 1-liter glass resin kettle equipped with a mechanical stirrer, inlet for introducing nitrogen, a temperature probe, and a water cooled condenser was charged with 350 g of Bisphenol A (BPA), 214.4 g of ethylene carbonate, 91.9 g of propylene carbonate, 0.73 g of potassium carbonate and heated to 185° C. The reactor was blanketed with nitrogen after the raw material addition and during the temperature ramp of the reaction. The reaction by-product, carbon dioxide, evolved when the reactor temperature reached 155-160° C. and subsequently removed from the reactor. Nitrogen purge was used as needed for the first 2 hours of reaction time and then resumed during the last 2.5 hours. The reaction temperature was maintained at 185° C. with stirring for a period of 4.5 hours, to yield a light yellow viscous product. A sample was taken to monitor the residual BPA by 1H NMR to ensure complete reaction of the BPA.

Stage 2: Esterification

Following the completion of stage 1, the glass kettle was charged with 149.9 g of terephthalic acid (TPA), 56.1 g of dodecenylsuccinic anhydride (DDSA part 1), and 1.78 g of Fascat 4100 catalyst (butylstannoic acid) and heated to 200° C. with stirring under a nitrogen atmosphere. At 190° C. reactor temperature, taking time zero for esterification reaction, the reaction by-product water starts to be produced and subsequently removed from the reactor. The reaction temperature was maintained at 200° C. for 1.5 hours. No nitrogen blanketing was necessary at this step. After 1.5 hours, nitrogen purge was resumed and reactor temperature was set from 200° C. to 215° C. for a period of 4.5 hours, from 215° C. to 220° C. for 2 hours, from 220° C. to 225° C. for 1 hour, from 225° C. to 230° C. for 1 hour (or longer, maximum at 235° C.) to achieve an acid value less than 1.5 mg KOH/g of resin (0.56 g of resin sample in 25 ml of THF). When the target acid value was reached, the reactor temperature was lowered to 170° C. for stage 3.

Stage 3: Polycondensation

Following the completion of stage 2, the glass kettle was charged with 19.18 g of trimellitic anhydride (TMA) and 111.9 g of DDSA (part 2) and heated to 210° C. with the nitrogen purge. The reactor temperature was set to 210° C. for 1 hour, 215° C. for 1 hour, and 220° C. for 1 hour. After 3 hours, the mixture was transferred from the glass kettle to 1-liter Parr reactor and the polycondensation continued. The temperature in the Parr reactor was set to 235° C. with stirring and low vacuum was applied for the first 1 hour. A full vacuum was applied in the next couple of hours to reach the target softening point (122° C.-125° C.) and the acid value (10-14 mg KOH/g of resin, 0.56 g of resin in 100 ml THF). The product was discharged from the vessel. The polyester resin had an acid value (AV) of 11.3 mg KOH/g, a softening temperature (Ts) of 123.6° C., and a glass transition temperature (Tg) of 55.1° C. The resin was emulsified by the phase inversion emulsification process and the converted emulsion was used to prepare toner Toner-1.

Example 2

Resin-2:

Trimellitic anhydride loading of 6.15 mole percent in total acid and the total diacid/diol molar ratio was 1.132.

The batch was prepared using the same procedure described in Example 1 except for the changes in raw material loadings as specified. During the esterification step the glass kettle was charged with 115.6 g of terephthalic acid, 58.2 g of DDSA part 1, and 1.80 g of Fascat 4100 catalyst. Upon completion of stage 2, during the polycondensation step the glass kettle was charged with 19.9 g of TMA and 116.1 g of DDSA part 2. The final resin product had an acid value of 10.4 mg KOH/g, a Ts of 123.4° C., and a Tg of 55.0° C. The resin was emulsified by the phase inversion emulsification process and the converted emulsion was used to prepare toners Toner-2 and Toner-7.

Example 3

Resin-3:

Trimellitic anhydride loading of 8.5 mole percent in total acid and the total diacid/diol molar ratio was 1.09.

The batch was prepared using the same procedure described in Example 1 except for the changes in raw material loadings as specified. During the esterification step, the glass kettle was charged with 141.8 g of terephthalic acid, 55.5 g of DDSA part 1, and 1.77 g of Fascat 4100 catalyst. Upon completion of stage 2, during the polycondensation step the glass kettle was charged with 26.2 g of TMA and 110.7 g of DDSA part 2. The final product had an acid value of 11.7 mg KOH/g, a Ts of 124.3° C., and a Tg of 54.5° C. The resin was emulsified by the phase inversion emulsification process and the converted emulsion was used to prepare Toner-3.

Example 4

Resin-4:

Trimellitic anhydride loading of 8.5 mole percent in total acid and the total diacid/diol molar ratio was 1.132.

The batch was prepared using the same procedure described in Example 1 except for the changes in raw material loadings as specified. During the esterification step, the glass kettle was charged with 147.3 g of terephthalic acid, 57.6 g of DDSA part 1, and 1.79 g of Fascat 4100 catalyst. Upon the completion of stage 2, during the polycondensation step the glass kettle was charged with 27.2 g of TMA and 114.9 g of DDSA part 2. The final product had an acid value of 11.2 mg KOH/g, a Ts of 124.0° C., and a Tg of 54.4° C. The resin was emulsified by the phase inversion emulsification process and converted emulsion was used to prepare Toner-4.

Example 5

Resin-5:

Trimellitic anhydride loading of 7.325 mole percent in total acid and the total diacid/diol molar ratio was 1.111.

The batch was prepared using the same procedure described in Example 1 except for the changes in raw material loadings as specified. During the esterification step, the glass kettle was charged with 148.6 g of terephthalic acid, 56.9 g of DDSA part 1, and 1.79 g of Fascat 4100 catalyst. Upon the completion of stage 2, during the polycondensation step the glass kettle was charged with 23.1 g of TMA and 113.4 g of DDSA part 2. The final product had an acid value of 10.7 mg KOH/g, a Ts of 123.3° C., and a Tg of 54.6° C. The resin was emulsified by the phase inversion emulsification process and the converted emulsion was used to prepare Toner-5.

Example 6

Resin-6:

Trimellitic anhydride loading of 6.15 mole percent and the total diacid/diol molar ratio was 1.132.

This resin was prepared following the same procedure described in Example 2 except for the changes in raw material loadings as specified. This resin was emulsified by the phase inversion emulsification process and the converted emulsion was used to prepare Toner-6.

Example 7

Resin-7:

Trimellitic anhydride loading of 6.15 mole percent and the total diacid/diol molar ratio was 1.132.

This resin was prepared following the same procedure described in Example 6. This resin was emulsified by the phase inversion emulsification process and the converted emulsion was used to prepare Toner-8.

Example 8

Resin-8:

Trimellitic anhydride loading of 7.325 mole percent and the total diacid/diol molar ratio was 1.111.

This resin was prepared following the same procedure described in Example 5. This resin was emulsified by the phase inversion emulsification process and the converted emulsion was used to prepare Toner-9.

Example 9

Resin-9:

Trimellitic anhydride loading of 7.325 mole percent and the total diacid/diol molar ratio was 1.111.

This resin was prepared following the same procedure described in Example 8. This resin was emulsified by the phase inversion emulsification process and the converted emulsion was used to prepare Toner-10.

Example 10

Control Resin:

The control resin was prepared according to the procedure disclosed in U.S. Pat. No. 8,288,499 at columns 9 and 10, incorporated herein by reference.

Into a reactor equipped with stirring and controlled temperature was charged 228 g (1 mole) of bisphenol A and 2 g of potassium hydroxide. Ethylene oxide (2 moles) was introduced at 135° C. under pressure ranging from 0.1 to 0.4 MPa and the mixture was reacted for 3 hours. To this reaction product was added 16 g of magnesium oxide-silica oxide absorbent Kyoward 600 and the mixture was stirred at 90° C. for 30 minutes. Thereafter, the resulting mixture was filtered to give the ethoxylated bisphenol A adduct.

Into a separate reactor equipped with stirring and controlled temperature was charged 238 g (1 mole) of bisphenol A and 2 g of potassium hydroxide. Propylene oxide (2 moles) was introduced at 135° C. under pressure ranging from 0.1 to 0.4 MPa and subjected to additional 3 hours for reaction. To the resulting product was added 16 g of magnesium oxide-silica oxide absorbent Kyoward 600 and the mixture was stirred at 90° C. for 30 minutes. Thereafter, the resulting mixture was filtered to give the propoxylated bisphenol A adduct.

Into a separate reactor equipped with a nitrogen inlet tube, a dehydration tube, a stirrer and thermocouple was charge ethoxylated bisphenol A adduct, propoxylated bisphenol A adduct in the desired ratios, with terephthalic acid and a tin catalyst. The ingredients were reacted at 230° C. over a period of 8 hours and the further reacted under vacuum at 8.3 kPa for 1 hour. Further trimellitic acid was added at 210° C. and reacted under pressure (101.3 kPa) for 1 hour then a further time at 8.3 kPa until the resin met the desired softening point. This resin was used to make toner particles.

Table 2 below summarizes the resin molecular weight distributions which were measured by gel permeation chromatograph (GPC).

TABLE 2

| ID | Example | Mn | Mp | Mw | Mz | PD (Mw/Mn) |
|---|---|---|---|---|---|---|
| Resin-1 | 1 | 7,686 | 24,164 | 45,431 | 124,255 | 5.91 |
| Resin-2 | 2 | 7,458 | 23,864 | 47,889 | 137,693 | 6.42 |
| Resin-3 | 3 | 7,370 | 18,050 | 58,109 | 203,785 | 7.88 |

TABLE 2-continued

| ID | Example | Mn | Mp | Mw | Mz | PD (Mw/Mn) |
|---|---|---|---|---|---|---|
| Resin-4 | 4 | 7,315 | 18,259 | 54,580 | 184,417 | 7.46 |
| Resin-5 | 5 | 7,074 | 23,591 | 47,944 | 141,462 | 6.78 |
| Resin-6 | 6 | 6,754 | 23,523 | 44,655 | 125,217 | 6.61 |
| Resin-7 | 7 | 6,758 | 20,547 | 43,008 | 121,809 | 6.36 |
| Resin-8 | 8 | 6,995 | 21,765 | 55,423 | 184,727 | 7.92 |
| Resin-9 | 9 | 7,326 | 21,849 | 52,878 | 170,363 | 7.22 |
| Control Resin | 10 | 5,412 | 11,834 | 87,978 | 442,949 | 16.26 |

As shown in Table 2, the control resin is considerably more polydispersed than the disclosure resins of the present embodiments (Examples 1-9). In particular, the Mz parameter is at least two-fold smaller than that of the control resin, which means there is less overall branched material that could cause solubility issues in the phase inversion emulsification process.

2) Toner Aggregation and Coalescence

Example 11

Cyan Toner Toner-1 (Prepared from Resin-1):

A cyan polyester EA toner was prepared at the 4 liter bench scale (380 g dry theoretical toner). Amorphous resin emulsions (261.7 g amorphous polyester Resin 1 at 37.57% solids & 470.4 g Resin-1 at 20.5% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 1042.9 g deionized water are mixed in a 4 liter glass kettle and then pH adjusted to 4.2 using 0.3 M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.39 microns with a GSD volume of 1.24, GSD number of 1.25, and then a mixture of 144.5 g and 259.8 g of above mentioned amorphous polyester resin 1 and Resin-1 dispersion) emulsions were added as shell material, resulting in a core-shell structured particles with an average particle size of 5.53 microns, GSD volume 1.20, GSD number 1.21. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8. Toner particles have average particle size of 6.21 microns, GSD volume 1.23, GSD number 1.23. After maintaining the reaction temperature at 85° C. and pH at 7.8 for about 175 minutes, the pH naturally dropped to 7.42 for coalescence. The toner was quenched after coalescence, resulting in a final particle size of 6.14 microns, GSD volume 1.23, GSD number 1.23. The toner slurry was then cooled to 40° C., separated by sieving through 25 μm screen, filtered, followed by washing and freeze drying. The circularity of final particle is 0.981 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-1. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 12

Cyan Toner-2 (Prepared from Resin-2)

A cyan polyester EA toner was prepared at the 4 liter bench scale (380 g dry theoretical toner). Amorphous resin emulsions (261.7 g amorphous polyester resin 1 at 37.57% solids & 397.6 g Resin-2 at 24.2% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 1042.9 g deionized water are mixed in a 4 liter glass kettle and then pH adjusted to 4.2 using 0.3M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.49 microns with a GSD volume of 1.23, GSD number of 1.28, and then a mixture of 144.5 g and 219.6 g of above mentioned amorphous polyester resin 1 and synthesized Resin-2 emulsions were added as shell material, resulting in a core-shell structured particles with an average particle size of 5.59 microns, GSD volume 1.20, GSD number 1.20. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8. Toner particles have average particle size of 6.54 microns, GSD volume 1.23, GSD number 1.23. After maintaining the reaction temperature at 85° C. and pH at 7.8 for about 175 minutes, the pH naturally dropped to 7.44 for coalescence. The toner was quenched after coalescence, resulting in a final particle size of 6.14 microns, GSD volume 1.23, GSD number 1.23. The toner slurry was then cooled to 40° C., separated by sieving through 25 μm screen, filtered, followed by washing and freeze drying. The circularity of final particle is 0.978 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-1. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 13

Cyan Toner-3 (Prepared from Resin-3)

A cyan polyester EA toner was prepared at the 4 liter bench scale (380 g dry theoretical toner). Amorphous resin emulsions (261.7 g amorphous polyester resin 1 at 37.57% solids & 467.4 g Resin-3 at 20.6% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 1042.9 g deionized water are mixed in a 4 liter glass kettle and then pH adjusted to 4.2 using 0.3 M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.68 microns with a GSD volume of 1.23, GSD number of 1.27, and then a mixture of 144.5 g and 258.1 g of above mentioned amorphous polyester resin 1 and Resin-3 resin emulsions were added as shell material, resulting in a core-shell structured particles with an average particle size of 5.59 microns, GSD volume 1.21, GSD number 1.26. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8.

Toner particles have average particle size of 6.54 microns, GSD volume 1.23, GSD number 1.23. After maintaining the reaction temperature at 85° C. and pH at 7.8 for about 175 min, the pH naturally dropped to 7.43 by using Sodium Acetate buffer for coalescence. The toner was quenched after coalescence, resulting in a final particle size of 6.02 microns, GSD volume of 1.23, GSD number of 1.23. The toner slurry was then cooled to 40° C., separated by sieving through 25 µm screen, filtered, followed by washing and freeze drying. The circularity of final particle is 0.974 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-3. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 14

Cyan Toner-4 (Prepared from Resin-4)

A cyan polyester EA toner was prepared at the 4 liter bench scale (380 g dry theoretical toner). Amorphous resin emulsions (261.7 g amorphous polyester resin 1 at 37.57% solids & 491.49 g Resin-4 at 19.6% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 1021.9 g deionized water are mixed in a 4 liter glass kettle and then pH adjusted to 4.2 using 0.3 M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.44 microns with a GSD volume of 1.23, GSD number of 1.24, and then a mixture of 144.5 g and 271.43 g of above mentioned amorphous polyester resin 1 and Resin-4 resin emulsions were added as shell material, resulting in a core-shell structured particles with an average particle size of 5.53 microns, GSD volume 1.19, GSD number 1.21. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8.

Toner particles have average particle size of 6.41 microns, GSD volume 1.22, GSD number 1.23. After maintaining the reaction temperature at 85° C. and pH at 7.8 for about 175 min, the pH naturally dropped to 7.42 by using Sodium Acetate buffer for coalescence. The toner was quenched after coalescence, resulting in a final particle size of 6.08 microns, GSD volume of 1.23, GSD number of 1.23. The toner slurry was then cooled to 40° C., separated by sieving through 25 µm screen, filtered, followed by washing and freeze drying. The circularity of final particle is 0.974 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-1. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 15

Cyan Toner-5 (Prepared from Resin-5)

A cyan polyester EA toner was prepared at the 4 liter bench scale (355 g dry theoretical toner). Amorphous resin emulsions (244.45 g amorphous polyester resin 1 at 37.57% solids & 383.47 g Resin-5 at 23.48% solids), 69.73 g crystalline polyester emulsion at 35.33% solids, 3.83 g surfactant (Dowfax 2A1), 107.48 g wax (IGI) at 30.5% solids, 125.12 g pigment (Cyan 15:3 Dispersion at 17.01% solid) and 1038.12 g deionized water are mixed in a 4 liter glass kettle and then pH adjusted to 4.2 using 0.3M nitric acid. The slurry is then homogenized for a total of 5 minutes at 3000-4000 rpm while adding in the coagulant, 84.98 g aluminum sulphate solution. The mixture was heated to 40° C. to aggregate the particles while stirring at 200 rpm. The particle size was monitored with a Coulter Counter until the core particles reached a volume average particle size of 4.58 microns with a GSD volume of 1.25, GSD number of 1.27, and then a mixture of 135.0 g and 211.78 g of above mentioned amorphous polyester resin 1 and Resin-5 resin emulsions were added as shell material, resulting in a core-shell structured particles with an average particle size of 5.65 microns, GSD volume 1.19, GSD number 1.21.

Thereafter, the pH of the reaction slurry was then increased to 4.2 using 1 weight percent NaOH solution followed by 13.65 g of Versene to freeze the toner particle growth. After freezing, the reaction mixture was heated to 85° C. while maintaining pH greater than 7.8.

Toner particles have average particle size of 6.27 microns, GSD volume 1.22, GSD number 1.21. After maintaining the reaction temperature at 85° C. and pH at 7.8 for about 175 min, the pH naturally dropped to 7.39 by using Sodium Acetate buffer for coalescence. The toner was quenched after coalescence, resulting in a final particle size of 5.95 microns, GSD volume of 1.22, GSD number of 1.21. The toner slurry was then cooled to 40° C., separated by sieving through 25 μm screen, filtered, followed by washing and freeze drying. The circularity of final particle is 0.975 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-5. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 16

Cyan Toner-6 (Prepared from Resin-6)

A cyan polyester EA toner was prepared at the 4 liter bench scale (380 vg dry theoretical toner). Amorphous resin emulsions (261.7 vg amorphous polyester resin 1 at 37.57 v % solids & 637.02 g Resin-6 at 15.13% solids), 83.2 g crystalline polyester emulsion at 35.33% solids, 4.1 g of surfactant (Dowfax 2A1 2A1), 115.05 g of wax (IGI) at 30.5% solids, 133.9 g of pigment (Cyan 15:3 Dispersion at 17.01% solid) and 884.69 g of deionized water are mixed in a 4 liter glass kettle and then pH adjusted to 4.2 using 0.3M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.44 microns with a GSD volume of 1.25, GSD number of 1.25, and then a mixture of 144.5 g and 351.81 g of above mentioned amorphous polyester resin 1 and Resin-6 resin emulsions were added as shell material, resulting in a core-shell structured particles with an average particle size of 5.65 microns, GSD volume 1.20, GSD number 1.21. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8.

Toner particles have average particle size of 6.54 microns, GSD volume 1.22, GSD number 1.22. After maintaining the reaction temperature at 85° C. and pH at 7.8 for about 170 min, the pH dropped to 7.27 by using Sodium Acetate buffer for coalescence. The toner was quenched after coalescence, resulting in a final particle size of 6.14 microns, GSD volume of 1.22, GSD number of 1.21. The toner slurry was then cooled to 40° C., separated by sieving through 25 μm screen, filtered, followed by washing and freeze drying. The circularity of final particle is 0.975 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-6. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 17

Cyan Toner-7 (Prepared from Resin-2)

A cyan polyester EA toner was prepared at the 4 liter bench scale (384 g dry theoretical toner). Amorphous resin emulsions (264.42 g of amorphous polyester resin 1 at 37.57% solids & 414.63 g of Resin-2 amorphous polyester resin at 23.49% solids), 75.43 g crystalline polyester emulsion at 35.33% solids, 4.1 g surfactant (Dowfax 2A1 2A1), 116.25 g wax (IGI) at 30.5% solids, 135.33 g pigment (Cyan 15:3 Dispersion at 17.01% solid) and 1123.1 g deionized water are mixed in a 4 liter glass kettle and then pH adjusted to 4.2 using 0.3M nitric acid. The slurry is then homogenized for a total of 5 minutes at 3000-4000 rpm while adding in the coagulant, 91.9 g aluminum sulphate solution. The mixture was heated to 40° C. to aggregate the particles while stirring at 200 rpm. The particle size was monitored with a Coulter Counter until the core particles reached a volume average particle size of 4.83 microns with a GSD volume of 1.26, GSD number of 1.32, and then a mixture of 146.03 g and 228.98 g of above mentioned amorphous polyester resin 1 and Resin-2 resin emulsions were added as shell material, resulting in a core-shell structured particles with an average particle size of 5.53 microns, GSD volume 1.19, GSD number 1.21. Thereafter, the pH of the reaction slurry was then increased to 4.2 using 1 weight percent NaOH solution followed by 14.77 g of Versene to freeze the toner particle growth. After freezing, the reaction mixture was heated to 85° C. while maintaining pH greater than 7.8.

Toner particles have average particle size of 6.21 microns, GSD volume 1.20, GSD number 1.22. After maintaining the reaction temperature at 85° C. and pH at 7.8 for about 165 min, the pH naturally dropped to 7.35 by using Sodium Acetate buffer for coalescence. The toner was quenched after coalescence, resulting in a final particle size of 5.89 microns, GSD volume of 1.21, GSD number of 1.21. The toner slurry was then cooled to 40° C., separated by sieving through 25 μm screen, filtered, followed by washing and freeze drying. The circularity of final particle is 0.975 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-7. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 18

Cyan Toner-8 (Prepared from Resin-7)

A cyan polyester EA toner was prepared at the 4 liter bench scale (380 g dry theoretical toner). Amorphous resin emulsions (261.7 g amorphous polyester resin 1 at 37.57% solids & 485.06 g Resin-7 amorphous polyester resin at 19.87% solids), 83.2 g crystalline polyester emulsion at 31.7% solids, 4.1 g surfactant (Dowfax 2A1 2A1), 114.8 g wax (IGI) at 30.5% solids, 133.9 g pigment (Cyan 15:3 Dispersion at 17.01% solid) and 1028.3 g deionized water are mixed in a 4 liter glass kettle and then pH adjusted to 4.2 using 0.3M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.53 microns with a GSD volume of 1.23, GSD number of 1.25, and then a mixture of 144.5 g and 267.88 g of above mentioned amorphous polyester resin 1 and Resin-7 resin emulsions were added as shell material, resulting in a core-shell structured particles with an average particle size of 5.47 microns, GSD volume 1.20, GSD number 1.22. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8. Toner particles have average particle size of 6.27 microns, GSD volume 1.24, GSD number 1.23. After maintaining the reaction temperature at 85° C. and pH at 7.8 for about 190 min, the pH naturally dropped to 7.43 by using Sodium Acetate buffer for coalescence.

The toner was quenched after coalescence, resulting in a final particle size of 6.21 microns, GSD volume of 1.24, GSD number of 1.23. The toner slurry was then cooled to 40° C., separated by sieving through 25 μm screen, filtered, followed by washing and freeze drying. The circularity of final particle is 0.976 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-8. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 19

Cyan Toner-9 (Prepared from Resin-8)

A cyan polyester EA toner was prepared at the 4 liter bench scale (380 g dry theoretical toner). Amorphous resin emulsions (275.22 g amorphous polyester resin 1 at 35.72% solids & 513.48 g Resin-8 amorphous polyester resin at 18.77% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 986.34 g of deionized water are mixed in a 4 liter glass kettle and then pH adjusted to 4.2 using 0.3M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.30 microns with a GSD volume of 1.25, GSD number of 1.26, and then a mixture of 151.99 g and 283.58 g of above mentioned amorphous polyester resin 1 and Resin-8 resin emulsions were added as shell material, resulting in a core-shell structured particles with an average particle size of 6.54 microns, GSD volume 1.25, GSD number 1.24. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8.

Toner particles have average particle size of 6.21 microns, GSD volume 1.24, GSD number 1.23. After maintaining the reaction temperature at 85° C. and pH at 7.8 for about 180 min, the pH naturally dropped to 7.35 for coalescence. The toner was quenched after coalescence, resulting in a final particle size of 6.14 microns, GSD volume of 1.25, GSD number of 1.23. The toner slurry was then cooled to 40° C., separated by sieving through 25 μm screen, filtered, followed by washing and freeze drying. The circularity of final particle is 0.980 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-9. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Example 20

Cyan Toner-10 (Prepared from Resin-9)

A cyan polyester EA toner was prepared at the 4 liter bench scale (380 g dry theoretical toner). Amorphous resin emulsions (275.22 g amorphous polyester resin 1 at 35.72% solids & 650.34 g Resin-9 amorphous polyester resin at 14.82% solids), 83.2 g crystalline polyester emulsion at 31.7% solids, 4.1 g surfactant (Dowfax 2A1), 114.8 g wax (IGI) at 30.5% solids, 133.9 g pigment (Cyan 15:3 Dispersion at 17.01% solid) and 849.48 g of deionized water are mixed in a 4 liter glass kettle and then pH adjusted to 4.2 using 0.3M nitric acid. The slurry is then homogenized for a total of 5 minutes at 3000-4000 rpm while adding in the coagulant, 90.9 g aluminum sulphate solution. The mixture was heated to 40° C. to aggregate the particles while stirring at 200 rpm. The particle size was monitored with a Coulter Counter until the core particles reached a volume average particle size of 4.53 microns with a GSD volume of 1.26, GSD number of 1.42, and then a mixture of 151.99 g and 359.16 g of above mentioned amorphous polyester resin 1 and Resin-9 resin emulsions were added as shell material, resulting in a core-shell structured particles with an average particle size of 5.42 microns, GSD volume 1.20, GSD number 1.22. Thereafter, the pH of the reaction slurry was then increased to 4.2 using 1 weight percent NaOH solution followed by 14.62 g of Versene to freeze the toner particle growth. After freezing, the reaction mixture was heated to 85° C. while maintaining pH greater than 7.8.

Toner particles have average particle size of 6.21 microns, GSD volume 1.24, GSD number 1.22. After maintaining the reaction temperature at 85° C. and pH at 7.8 for about 190 min, the pH naturally dropped to 7.35 by using Sodium Acetate buffer for coalescence. The toner was quenched after coalescence, resulting in a final particle size of 5.89 microns, GSD volume of 1.23, GSD number of 1.22. The toner slurry was then cooled to 40° C., separated by sieving through 25 μm screen, filtered, followed by washing and freeze drying. The circularity of final particle is 0.975 which was measured by FPIA 3000 instrument. The particles were then blended with the following surface additives 0.28 weight percent cerium oxide, 0.5 weight percent PMMA, 0.86 weight percent RX50, 1.29 weight percent RY50L silica, 0.88 weight percent STT100H titanium oxide, 1.73 weight percent X24 and 0.18 weight percent zinc stearate producing Toner-10. This toner was evaluated in the Xerox 700 machine for xerographic performance in stress zones as a function of toner age in both A-zone and J-zone calculated from the area coverage of the printed toner. The toner charge was stable with very little change upon aging in both A-zone and J-zone. Average charge distributions were similar to the control toner, all solid area optical densities, graininess, mottle, halftone starvation and background are similar to the control toner.

Machine Performance of Toners

Machine Testing. The toners described above were compared with the commercially available Xerox 700 toner by running them through a Xerox 700 Digital Color Press machine, in both A-zones and J-zones.

Toner Examples 11-21 were evaluated under stress machine conditions in A-zone and J-zone. The xerographic machine performance of these toners which cover the TMA loading range from 6.15 mole % to 8.5 mole % and the diacid to diol molar ratio of from 1.09 to 1.132. All of the toners show good machine performance where the required toner properties (compared to a commercially available Xerox 700 EA Eco toner) are satisfied and met.

What is claimed is:

1. A method of making a branched polyester resin comprising:
    contacting a monomer bisphenol A (BPA) with a mixture of cyclic alkylene carbonates in the presence of a base to obtain a reaction mixture comprising two or more alkoxylated BPA monomers;
    copolymerizing the two or more alkoxylated BPA monomers with a diacid in the presence of a catalyst to obtain a copolymer; and
    condensing the copolymer with an acid anhydride, wherein the acid anhydride comprises a triacid or a tetraacid;
    wherein the branched polyester resin has an acid value of from about 8 mg KOH/g to about 14 mg KOH/g.

2. The method of claim 1, wherein the mixture of cyclic alkylene carbonates is selected from a group consisting of propylene carbonate, ethylene carbonate, 1,2-butylene carbonate, trans-1,3-butylene carbonate, 1,3-propylene carbonate, trans-2,3-butylene carbonate, or cis-2,3-butylene carbonate, and mixtures thereof.

3. The method of claim 1, wherein the mixture of cyclic alkylene carbonates comprises propylene carbonate and ethylene carbonate.

4. The method of claim 1, wherein a molar ratio of the monomer bisphenol A to the mixture of cyclic alkylene carbonates is from about 0.3 to about 2.5.

5. The method of claim 1, wherein further purification of the two or more alkoxylated BPA monomers is not required prior to the copolymerizing.

6. The method of claim 1, wherein the copolymerizing is conducted at a temperature in a range from about 180° C. to about 250° C.

7. The method of claim 1, wherein a molar ratio of the two or more alkoxylated BPA monomers to the diacid is from about 0.6 to about 1.5.

8. The method of claim 1, wherein the diacid comprises terephthalic acid, dodecenylsuccinic anhydride (DDSA), or mixtures thereof.

9. The method of claim 1, wherein the catalyst is tin-based.

10. The method of claim 1, wherein the copolymer produced after the copolymerizing step has a viscosity of from about 2 to about 10 poise.

11. The method of claim 1, wherein the copolymer produced after the copolymerizing step has a softening temperature (Ts) of at least 95° C.

12. The method of claim 1, wherein the condensing step is conducted at a temperature in a range from about 180° C. to about 250° C.

13. The method of claim 1, wherein the triacid is trimellitic anhydride.

14. The method of claim 1, wherein the acid anhydride further comprises a diacid.

15. The method of claim 1, wherein the diacid is dodecenylsuccinic anhydride.

16. The method of claim 1, wherein the branched resin has an acid value of from about 8 mg KOH/g to about 14 mg KOH/g, a softening temperature (Ts) of from about 100° C. to about 140° C., and a glass transition temperature of from about 35° C. to about 75° C.

17. A method of making a branched polyester resin comprising:
    contacting a monomer bisphenol A (BPA) with a mixture of propylene carbonate and ethylene carbonate in the presence of a base to obtain a reaction mixture comprising two or more alkoxylated BPA monomers;
    copolymerizing the two or more alkoxylated BPA monomers with a diacid in the presence of a catalyst to obtain a copolymer; wherein the diacid comprises terephthalic acid, dodecenylsuccinic anhydride (DDSA), or mixtures thereof; and
    condensing the copolymer with an acid anhydride, wherein the acid anhydride comprises a triacid;
    wherein the branched polyester resin has an acid value of from about 8 mg KOH/g to about 14 mg KOH/g.

18. The method of claim 17, wherein the branched resin has an acid value of from about 8 mg KOH/g to about 14 mg KOH/g, a softening temperature (Ts) of from about 100° C. to about 140° C., and a glass transition temperature of from about 35° C. to about 75° C.

19. A branched resin prepared by the method of claim 1.

* * * * *